Sept. 30, 1958 A. HEETMAN 2,854,517
ARRANGEMENT FOR IDENTIFYING CALLING LINES
Filed March 13, 1956
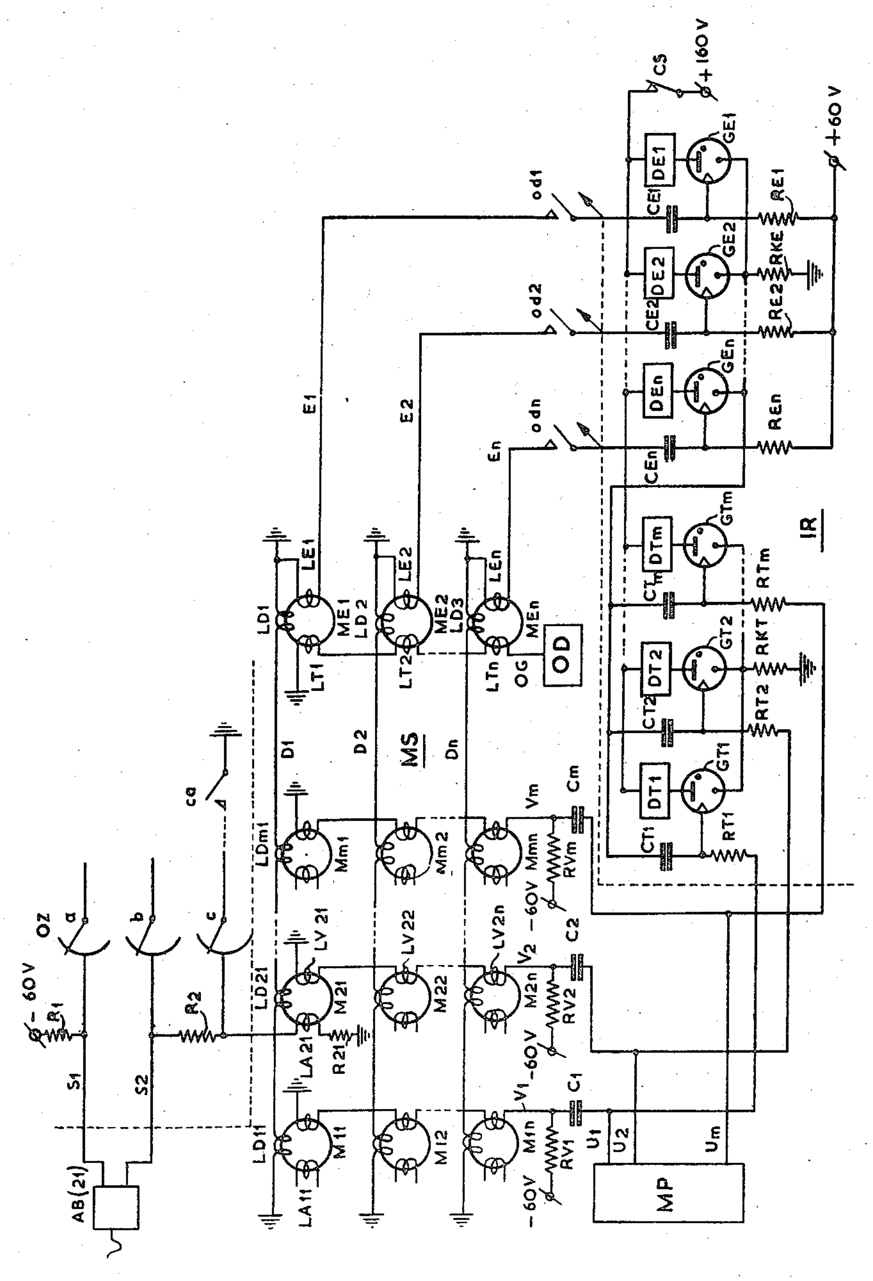
INVENTOR
ALPHONSUS HEETMAN
BY Fred M Vogel
AGENT 2,854,517
Patented Sept. 30, 1958

2,854,517

ARRANGEMENT FOR IDENTIFYING CALLING LINES

Alphonsus Heetman, Hilversum, Netherlands, assignor, by mesne assignments, to North American Philips Company, Inc., New York, N. Y., a corporation of Delaware Application March 13, 1956, Serial No. 571,303

Claims priority, application Netherlands March 28, 1955

2 Claims. (Cl. 179—18)

This invention relates to arrangements for automatic signalling systems, more particularly telephone systems, for identifying a calling line of a group of lines each having associated with it, according to a matrix, a first digit and a second digit, for example a tens digit and a units digit.

The object of the invention is to provide a simple arrangement by which a line may immediately be identified when a call is made. Such an arrangement is more particularly important in telephone systems comprising cross-bar switches.

In the arrangement according to the invention, each line has individually associated with it a magnetically presaturated core, and a direct current flows through a first winding on the core upon calling. Furthermore, provision is made of a multiphase pulse generator periodically supplying pulses shifted in time to a plurality of outlets each connected to a second winding on each of the cores of lines corresponding to the same first digit.

Provision is also made of a first set of pulse receivers each coupled via an identifying wire to a third winding on each of the cores of lines corresponding to the same second digit and a second set of pulse receivers which by means of the time-shifted pulses from the pulse generator are successively brought into a condition in which they can respond when a pulse is received via one of the identifying wires. When a pulse receiver of the first set and of the second set is responsive, the other pulse receivers are made insensitive to further pulses.

In order that the invention may be readily carried into effect, one embodiment will now be described, by way of example, with reference to the accompanying drawing.

The figure shows a telephone set of a subscriber AB, which is connected via line wires S1 and S2 to line contacts *a* and *b* of a group of line finders OZ. The line wire S1 is connected via a resistor R1 to the negative terminal of a battery (not shown), the positive terminal of which is connected to earth. The line wire S2 is connected via a resistor S2 to the *c*-test contact of the line finders OZ and to one end of a winding LA 21 on a magnetic core M21 individually associated with the line. The other end of the winding LA21 is connected to earth via a resistor R21. The subscriber AB forms part of a group of, say, 100 subscribers or more, the subscribers in the latter case being distributed over a plurality of groups of line finders. The subscribers' sets are distinguished from one another by two digits, for example in the case of 100 subscribers per group by the tens digit and the units digit of the subscriber's number, or in the case of a system having cross-bar switches by the digit of the switch and its position on the switch. The two last digits of the subscriber's number of the telephone set shown are, for example, equal to 21. The other subscribers' sets of the group are coupled in a similar manner to other magnetic cores which are ranged in the figure according to a matrix MS in such manner that the sets having the same tens digit are coupled to the cores of the same vertical column of the matrix, for example the cores M11, M12 . . . M1*n* for the sets, of which the tens digit is 1, or coupled to the cores M21, M22 . . . M2*n* for the sets, of which the tens digit is equal to 2. The sets having the same units digit are coupled to the cores of the same horizontal row of the matrix MS, for example the sets of which the units digit is equal to 1 are coupled to the cores M11, M21 . . . M*n*1, and the sets of which the units digit is equal to 2 are coupled to the cores M12, M22 . . . M2*n*. The cores of the same horizontal row of the matrix MS are coupled by means of a second winding and one of the identifying wires D1, D2 . . . D*n* to a winding on one of the auxiliary cores ME1, ME2 . . . ME*n*. Thus, for example, the cores M11, M21 . . . M*m*1 are coupled by means of windings LD11, LD21 . . . LD*m*1 and the identifying wire D1 to the winding LD1 on the core ME1. The cores M12, M22 . . . M*m*2 are coupled in a similar manner via wire D2 to the winding LD2 on the core ME2. The cores of the same vertical column of the matrix MS simultaneously receive a pulse from a multiphase pulse generator MP. The pulse generator MP is of a design such that it periodically supplies pulses shifted in time to its outlets U1, U2 . . . U*m*, which are connected to a third winding on the core of the same vertical column of the matrix MS. Thus, for example, the outlet U2 is coupled via capacitor C2 and a pulse wire V2 to the windings LV21, LV22, . . . LV2*n* on the cores M21, M22 . . . M2*n*. However, the pulses are normally not transferred to the identifying wires D1, D2, . . . D*n*, the cores normally being magnetically presaturated as a result of the direct current flowing through the third winding. Thus, for example, the cores M21, M22 . . . M2*n* are magnetically presaturated by the direct current flowing through the circuit comprising a resistor RV2, the wire V2 and the windings LV2*n* . . . LV22 and LV21.

However, if one of the subscribers, for example subscriber 21, is calling, a circuit is established from the negative terminal of the battery via resistor R1, line wire S1, telephone set of subscriber AB (21), line wire S2, resistor R2, winding LA21 and resistor R21 to earth. As a result of the direct current flowing through said circuit via winding LA21, the magnetic condition of the core M21 is varied in such manner that the pulses are now transferred from the winding LV21 to the winding LD21 and the identifying wire D1. The auxiliary core ME1 transfers the pulses from the winding LD1 via the winding LE1 to the identifying wire E1, and via the winding LT1, the windings LT2, . . . LT*n* on the auxiliary cores ME2 . . . ME*n* and the wire OG to a calling detector OD. The calling detector OD, which may be of a construction known per se, responds thereto and connects via contacts *od*1, *od*2, . . . *odn* an identifying device IR, which, for example, may form part of a register circuit, to identifying wires E1, E2 . . . E*n*. The identifying device IR comprises two sets of pulse receivers, the first set comprising gas filled tubes GE1, GE2, . . . GE*n* and the second set comprising gas-filled tubes GT1, GT2 . . . GT*n*. The first group of the pulse receivers serves to identify the identification wires through which the pulses are supplied, in other words of the second digit associated with the calling line, that is to say the units digit, the other group of pulse receivers serving to determine the moment, at which the pulses are received, in other words to identify the first digit associated with the calling line, that is to say the tens digit.

The cathodes of the gas-filled tubes GE1, GE2 . . . GE*n* are connected to earth via a common resistor RKE, their anodes being connected via a winding on relays DE1, DE2 . . . DE*n* and back contact *cs* of a relay (not shown) to a voltage source of about 160 volts which is likewise not shown. The ignition electrodes of said tubes are connected on the one hand, via resistors RE1, RE2 . . . REn to a source having a voltage a little lower than the ignition voltage and, on the other hand, via capacitors CE1, CE2 . . . CEn and contacts *od*1, *od*2, . . . *odn* to the identifying wires E1, E2, . . . En. As a result of the pulses supplied via wire E1 when subscriber AB (21) is calling, the potential of the ignition electrode of gas-filled tube GE1 exceeds the striking voltage and the tube becomes conducting, so that relay DE1 is magnetised. As a result of the voltage drop across resistor RKE, the potential of the cathodes of the tubes of the group concerned increases to a value such that thereafter none of the other tubes can be ignited if a pulse were to be supplied through one of the identifying wires E2, etc. The units digit of the calling subscriber is thus identified.

The cathodes of the gas-filled tubes GT1, GT2 . . . GT*m* are connected to earth in a similar manner via a common resistor RKT, their anode circuit including the windings of relays DT1, DT2 . . . DT*m*. The ignition electrodes of said tubes are connected via resistors RT1, RT2 . . . RT*m* to the outlets U1, U2 . . . U*m* of pulse generator MP. The ignition electrodes are also coupled via capacitors CT1, CT2 . . . CT*m* to the cathodes of tubes GE1, GE2 . . . GE*n*. The ignition electrodes thus receive in succession an increased biassing potential, so that as a result of the pulse supplied via the capacitors CT1, CT2, etc. to the ignition electrodes of the tubes GT1, GT2 etc. when the potential of the cathode of the tubes GE1, GE2, etc. increases, one of the tubes CT1, CT2 is ignited and the associated relay energized. In the case under consideration, the gas-filled tube GT1 becomes conducting, since at the moment, at which the pulse is received via wire E1, the ignition electrode of this tube still has a comparatively high biassing potential whereas that of the other gas-filled tubes of this group is still comparatively low. It is to be noted in this connection that at the beginning of a pulse across an outlet of the pulse generator MP, the voltage of the ignition electrode connected to this outlet is still comparatively low, since it takes some time before the associated capacitor CT1, etc. has been charged. The pulse which occurs across the wire E1 when subscriber AB (21) is calling occurs, however, at the beginning of the pulse across outlet U2 due to the differentiating action of capacitor C2, this is to say at the moment, at which the ignition electrode of gas-filled tube GT1 still has a comparatively high biassing potential by the action of the pulse across the outlet U1, since it takes some time before capacitor CT1 has discharged. In connection therewith, the identifying digit 2 is assigned to the relay DT1, the identifying digit 3 is assigned to the relay DT2, and the identifying digit 1 is assigned to the relay DT*n*. Due to the voltage drop across resistor RKT, the potential of the cathodes of the gas-filled tubes GT1, GT2, etc. increases to a value such that none of the other tubes can be ignited, the subscriber concerned thus being identified. After the subscriber has been found by a line finder OZ in a manner which is not shown, the *c* wiper of this line finder is connected via contact *ca* to earth, so that the direct current traversing the winding LA (21) disappears and the core M21 returns to its initial magnetically presaturated condition. The identifying arrangement IR is restored to a condition for identifying a subsequent calling line due to contact *cs* being opened for a short time by means (not shown), as a result of which the gas-filled tubes DE1 and DT1 are extinguished.

What is claimed is:

1. An automatic signalling system for identifying a calling line of a group of lines which have associated therewith a first digit and a second digit arranged according to a matrix, comprising a plurality of magnetically presaturated across associated with said lines in a matrix manner, each of said cores having a first, a second and a third winding associated therewith, means responsive to a call on a line for causing a current to flow in the first winding of the core associated with the calling line, a multiphase pulse generator for periodically supplying pulses shifted in time to the second windings of said cores which are associated with lines having the same first digit, a first set of pulse receivers, identification wire means coupling said pulse receivers to the third windings of said cores which are associated with lines having the same second digit, a second set of pulse receivers connected to be brought successively into responsive condition by said time-shifted pulses, means connected to enable said second set of pulse receivers to respond when a pulse occurs on one of said identification wire means, and means connected to prevent the remainder of said pulse receivers from responding to a pulse when one of said pulse receivers is in a responsive condition.

2. A system as claimed in claim 1, in which each of said sets of pulse receivers comprises a plurality of gas-filled devices each having a pair of discharge electrodes, and in which said last-named means comprises a resistor in each set of receivers connected in common to a discharge electrode of all of said gas-filled devices of the respective set of receivers.

References Cited in the file of this patent

UNITED STATES PATENTS

| | | |
|---|---|---|
| 2,351,551 | Seibel | June 13, 1944 |
| 2,604,540 | Blake | July 22, 1952 |
| 2,694,753 | Den Hertog | Nov. 16, 1954 |

UNITED STATES PATENT OFFICE

CERTIFICATE OF CORRECTION

Patent No. 2,854,517 September 30, 1958

Alphonsus Heetman

It is hereby certified that error appears in the printed specification of the above numbered patent requiring correction and that the said Letters Patent should read as corrected below.

Column 4, line 21, for "presaturated across" read -- presaturated cores --.

Signed and sealed this 6th day of January 1959.

(SEAL)
Attest:

KARL H. AXLINE
Attesting Officer

ROBERT C. WATSON
Commissioner of Patents